Nov. 24, 1964  L. U. KIBLER  3,158,027
ELECTRONIC THERMOMETER
Filed July 5, 1961
FIG. 1
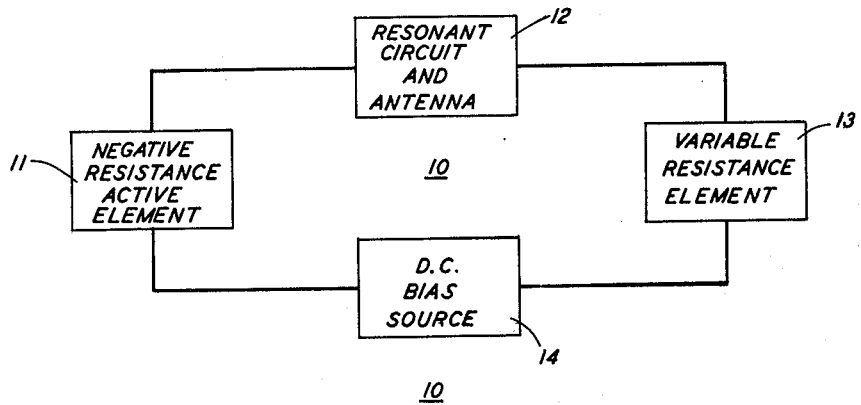
FIG. 3
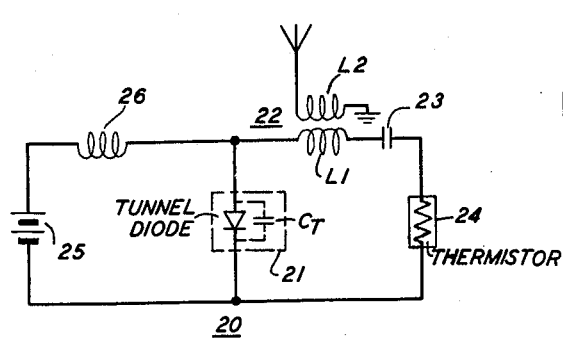
FIG. 4
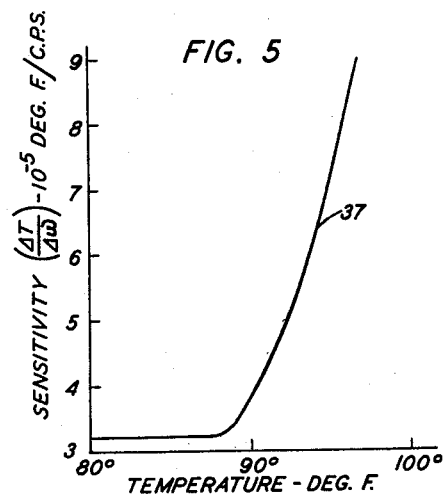
FIG. 2
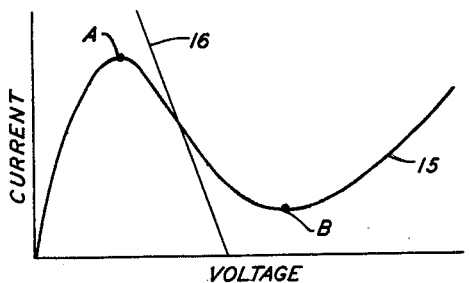
FIG. 5
INVENTOR
L. U. KIBLER
BY
ATTORNEY

United States Patent Office 3,158,027
Patented Nov. 24, 1964

3,158,027
ELECTRONIC THERMOMETER
Lynden U. Kibler, Middletown, N.J., assignor to Bell Telephone Laboratories, Incorporated, New York, N.Y., a corporation of New York
Filed July 5, 1961, Ser. No. 121,917
2 Claims. (Cl. 73—362)

This invention relates to temperature-sensitive measuring apparatus and, more particularly, to apparatus capable of functioning as an electronic thermometer within live organisms as well as in other remote, inaccessible environments.

Scientific exploration into the nature of our universe has led to the investigation of environments beyond the direct reach of man, either because of natural, physical or other as yet unsolved problems. As a result, the need for securing beneficial and important scientific data has resulted in the evolution of very specialized apparatus commonly known as telemetering systems. These systems are designed to relay pertinent data from a remote environment to a centralized location for observation and study. More specifically, telemetry apparatus has been designed, for example, for making temperature, pressure, humidity, radiation and many other types of readings selectively beneath the sea, in inaccessible places below the earth and, more recently, in outer space. To convey information about a chosen variable in such places, the apparatus usually involves a sensor, or circuit component having a parameter such as resistance or reactance, for example, which varies as a function of the variable under investigation. The effect which the chosen variable has on the particular parameter then is generally utilized to modulate or vary a radio-frequency wave in a prescribed manner.

The small physical size of the transistor has aided materially in reducing the size of such apparatus to miniaturized proportions. For example, a temperature-sensitive transistor oscillator may be constructed in a size comparable to a typical medicinal "pill." As such, the oscillator may be used to telemeter physiological information, such as temperature, pressure, and acidity readings, from within live organisms, as for example, the gastrointestinal tract of the human body. Such telemeters have become known as "endoradiosondes." Because of their miniaturized form, they have presented problems selectively in both design and manufacture with respect to size, weight, reliability, power consumption, stability and temperature-frequency sensitivity.

One form of prior art endoradiosonde basically comprises a (Hartley) blocking oscillator utilizing a transistor connected in the grounded emitter configuration. It has been found that with such a configuration, the back resistance of the collector junction is temperature-sensitive, at least to a limited extent. Accordingly, rectification that takes place during oscillation at the emitter may be used to charge a capacitor in the base circuit to effect a blocking or quenching action; only the peaks of the oscillatory wave cause appreciable conduction. As a result, once oscillation stops, a finite period is needed before enough charge leaks off to allow the transistor to resume operation. Since the leakage is essentially through the back resistance of the collector junction, the repetition rate of the resulting radio-frequency bursts is thus directly related to, and representative of, the temperature within the confines of the pill. Other forms of pill-sized transmitters have utilized temperature-sensitive capacitors and the like, in the tuning circuit.

A second type of endoradiosonde employs a diaphragm sealed over a chamber containing a low-boiling point liquid (pentane or hexane.) Temperature variations are thus transformed into pressure variations which directly alter the displacement of the diaphragm. Frequency modulation of oscillatory energy is then effected through the movement of a diaphragm-mounted ferrite disk or core that forms a part of a magnetic circuit containing a tuning inductance.

There are a number of factors detracting from the virtues of the aforementioned types of miniaturized temperature telemeters. For example, in the blocking oscillator type, changes in bias voltage adversely affect the accuracy of the burst repetition rate, and hence temperature sensitivity, much more than in a free running oscillator whose frequency is varied by a temperature-sensitive reactance or resistance element. The latter forms of transistor-oscillators, however, suffer from a lack of comparable sensitivity. Moreover, the temperature coefficient of resistance varies considerably from one transistor to another because of existing manufacturing tolerances. Hence, such standardized oscillator circuits with well controlled operating ranges are difficult to produce. Additionally, transistors are somewhat vulnerable to radiation, especially in the so-called Van Allen radiation belts. This compounds the problems involved in obtaining reliable telemetry data from outer space.

As for the pressure-temperature-sensitive type of oscillator, the operating temperature range is very limited. In addition, the circuitry becomes quite complex and disadvantageously involves electro-mechanical elements. A particular disadvantage of the electro-mechanical apparatus is that the diaphragm, usually comprising a rubber membrane, tends to change its elastic properties in various body fluids. Hence, to minimize this, the majority of the restoring force is usually supplied by an auxiliary spring. An outer removable limp diaphragm has also been employed to minimize changes in the elasticity of the main diaphragm.

Accordingly, it is an object of this invention to increase the sensitivity and temperature responsive range of active, miniaturized, temperature telemeters.

It is a more specific object of this invention to translate temperature variations into frequency variations in a manner devoid of electro-mechanical apparatus or pressure-sensitive liquids, gases or diaphragms.

A related object of the invention is to utilize an active element in an oscillator of uniquely simple construction and adaptable to encapsulation in a pill-sized electronic thermometer. A concomitant related object is to utilize an active element which is substantially immune to radiation, but is particularly sensitive to changes in oscillator circuit resistance.

In accordance with an aspect of the invention in one illustrative embodiment, an electronic thermometer that is suitable for encapsulation in a pill-size container, comprises a tunnel diode oscillator whose frequency is directly dependent on the resistance of the oscillator circuit. A thermistor, which may exhibit either a positive or a negative coefficient of resistance, preferably is utilized as a part of the total circuit resistance. Variations in temperature which alter the resistance of the thermistor are, accordingly, utilized in the present invention to produce a correlative change in oscillator frequency. As will presently be seen in greater detail hereinafter, the tunnel diode is particularly well suited for use in a resistance dependent oscillator circuit because its frequency versus resistance sensitivity is superior to that of prior art active elements, e.g., transistors. As a result, the instant invention as embodied comprises a temperature telemeter of uniquely simplified construction and exhibits a frequency versus resistance sensitivity that makes possible temperature measurements over a range, and with a degree of accuracy, not found possible with prior art counterparts.

The invention will be more fully apprehended from the following detailed description of preferred illustrative embodiments thereof when taken in conjunction with the appended drawings, in which:

FIG. 1 is a block circuit diagram of a temperature-responsive telemeter in accordance with the principles of the invention;

FIG. 2 represents a typical current versus voltage characteristic curve of a tunnel diode utilized in the variable frequency transmitter of FIG. 1, and, further, indicates one type of variable resistance loading which advantageously biases the tunnel diode such that its frequency may be varied as a function of resistance;

FIGS. 3 and 4 are schematic circuit diagrams of temperature-responsive, variable-frequency transmitters embodying the principles of the invention; and FIG. 5 is a graph representing the temperature versus frequency-sensitivity of the transmitters of FIGS. 3 and 4.

Considering the drawings more particularly, FIG. 1 depicts an oscillator 10 whose frequency varies as a function of temperature. As such, the oscillator functions as a variable-frequency, temperature-responsive transmitter. The basic circuit components comprise a negative resistance active element 11, preferably a tunnel diode, a resonant output circuit 12, which may include any necessary antenna, a temperature-sensitive resistance element 13, preferably a thermistor with either a positive or a negative coefficient of resistance, and a direct-current bias source 14, e.g., a battery.

In accordance with the invention, the unique frequency versus resistance sensitivity of a tunnel diode is utilized as the control parameter to vary the frequency of oscillation as a function of temperature. More specifically, the oscillator frequency is made dependent on the total circuit resistance which effectively loads the tunnel diode. This resistance comprises primarily the thermistor resistance, the internal resistance of the tunnel diode and the lead resistance being minimal. As will be seen in the description of the more detailed embodiments hereinafter, the oscillator may take a number of circuit forms. Since the thermistor resistance in either case is predominant, any variations in temperature that alter it produce substantial correlative changes in the frequency of oscillation. The unique combination of elements depicted in FIG. 1 is thus seen to make possible a temperature telemeter readily adaptable to miniaturization and of unusually simplified construction. Its superior advantages with respect to sensitivity and tuning range will be considered in greater detail hereinafter. Before considering the more detailed circuit variations of FIG. 1, an understanding of the virtues of the tunnel diode, itself, as utilized in accordance with the invention, appears warranted at this point.

Structurally, the tunnel diode comprises basically a p-n junction having an electrode connected to each region. To this extent, it is very similar in construction to ordinary semiconductor diodes. The tunnel diode, however, requires two unique characteristics of the p-n junction; one is that it be narrow (the mechanical transition from n-type to p-type region must be abrupt), on the order of 100 angstrom units in thickness; the other is that both regions be degenerate (i.e., contain very large impurity concentrations). For a more detailed discussion of the solid state physics of the tunneling process which gives rise to the negative resistance characteristics of these diodes, reference is made to an article entitled "New Phenomenon in Narrow Germanium P-N Junctions," by L. Esaki, Physical Review, volume 109, pages 603, 604, January–March, 1958.

Because of its unique physical make-up, the tunnel diode offers many advantages over prior art negative resistance devices, such as the dynatron and the point contact transistor in the common-emitter configuration. These include: reliability, high frequency capability, low noise properties, extremely small negative time constants, substantial immunity to radiation and high frequency versus resistance sensitivity, to mention but a few. All of these characteristics and, in particular, the latter characteristic, are advantageously and uniquely made use of in the instant invention.

FIG. 2 depicts a typical current versus voltage curve 15 for a tunnel diode and, in addition, illustrates a typical direct-current loading 16 which intersects the negative resistance region of the curve at an intermediate region thereof as is required to effect oscillation in the relaxation or free running mode. The resistance of the temperature sensitive thermistor is primarily determinative of both the slope and the location of the direct-current load line 16. From the I–V curve it is seen that the negative resistance region is quite pronounced and exists between the peak of the curve designated point A and the valley of the curve designated point B.

Considering now a more detailed circuit arrangement of transmitter 10, FIG. 3 depicts in schematic diagram form a temperature telemeter transmitter 20 embodying the principles of the invention. The radio-frequency circuit comprises in series relation a tunnel diode 21, a transformer 22 comprising inductances $L_1$, $L_2$, a blocking capacitor 23 and a thermistor 24. The inductance of coil $L_1$ is chosen to be resonant with the junction capacitance $C_T$ of the tunnel diode, preferably at the upper limit of the operating frequency as this gives the greatest sensitivity. The reactance of coil $L_2$, if employed, is chosen to provide the desired degree of antenna coupling. It should be noted that in many applications where the transmitter and receiver are relatively close together, coil $L_1$ may be utilized as the radiating antenna as well as the resonant circuit inductance. A direct-current bias source 25, preferably of a low internal resistance, and choke 26 are serially connected across the tunnel diode. The choke prevents radio-frequency current from flowing through the direct-current source.

FIG. 4 depicts an alternate variable frequency transmitter 30, in accordance with the principles of the invention, wherein a bias source 31 of very low internal resistance also may be advantageously utilized. As shown, a tunnel diode 32 is connected to shunt two parallel branches, one comprising thermistor 33 and blocking capacitor 34, and the other comprising direct-current bias source 31 and transformer 35, which may comprise inductances $L_1$, $L_2$. The inductance of coil $L_1$ is chosen, as in transmitter 20 of FIG. 2, to be resonant with the junction capacitance of the tunnel diode, not shown, and the inductance of coil $L_2$, if utilized, is chosen to provide the desired degree of antenna coupling.

With the circuit components of FIGS. 3 and 4 thus described and the important virtues of the tunnel diode as related to the instant invention understood, a more detailed examination of how the frequency of oscillation is related to the circuit resistance in transmitters 20 and 30 follows. It can be shown that the frequency of oscillation for these transmitters may be defined as follows:

$$F = \frac{1}{2\pi} \frac{1}{\sqrt{LC}} \sqrt{1 - |R_T G|} \qquad (1)$$

where C and G are the junction capacitance and conductance of the tunnel diode in the region of negative conductance, respectively, L is the circuit inductance and $R_T$ is the total effective diode biasing resistance and includes not only the thermistor resistance, but also the internal resistance of the tunnel diode itself and any passive resistance of the circuit. Equation 1 vividly indicates that the frequency of oscillation varies directly with changes in circuit resistance. For sinusoidal oscillation:

$$R_T = \frac{GL}{C}; \; R_T < \frac{1}{G} \qquad (2)$$

When $$R_T \text{ is } < \frac{GL}{C}$$

the oscillator will function as a relaxation type. However, if $$R_T \text{ is} \approx \frac{GL}{C}$$

the distortion of the sine wave generally is not serious.

In practice, a commercially available tunnel diode and a thermistor, incorporated in a circuit basically identical to the one depicted in FIG. 3, produced an oscillator frequency of 10.065 mc. at 87° F. When the thermistor alone was heated to 117° F., the circuit oscillated at 12.165 mc. Thus, a temperature change of only 30° F. effected a frequency change of 2.065 mc.

It would perhaps be beneficial to consider the temperature versus frequency sensitivity of the tunnel diode oscillators embodied herein more specifically. It can be shown that the angular frequency ω of oscillation for such a device may be expressed as follows:

$$\omega = \left[\frac{1-GR_L}{LC} - \frac{1}{4}\left(\frac{R_L}{L} - \frac{G}{C}\right)^2\right]^{1/2} \quad (3)$$

where $R_L$ represents the load or direct-current biasing resistance consisting primarily of the thermistor resistance. The frequency sensitivity is defined as:

$$\frac{d\omega}{dT} = \frac{d\omega}{dR} \cdot \frac{dR}{dT}$$

By taking the derivative of Equation 3, the frequency-temperature sensitivity becomes:

$$\frac{d\omega}{dT} = -\frac{1}{4}\left[\frac{1-GR_L}{LC} - \frac{1}{4}\left(\frac{R_L}{L} - \frac{G}{C}\right)^2\right]^{-1/2} \cdot \left(\frac{G}{LC} + \frac{R_L}{L^2}\right) \quad (4)$$

where $\alpha$ is the constant associated with the thermistor characteristic and $e^{-\alpha T}$ describes the thermistor temperature characteristic.

Equation 4 is difficult to plot as a general result. However, by taking the slope of the experimentally derived frequency versus temperature curve at several discrete points, a smooth temperature versus frequency sensitivity curve may be derived. Such a curve is shown in the graph of FIG. 5. As evidenced by the slope of the curve 37, the sensitivity of the variable-frequency tunnel diode oscillator is seen to decrease at the high temperature end of the curve. In practice, the oscillator is initially adjusted to oscillate at the high temperature end of the curve. Picking an operating point at random, it is seen that at a temperature of 90° F., the sensitivity equals:

$$\frac{\Delta T}{\Delta \omega} = (4.1 \times 10^{-5})\, °\text{F.}/\text{c.p.s.}$$

This sensitivity is considerably better than would be obtainable with either a vacuum tube or transistor in a similar circuit. Moreover, the temperature-frequency sensitivity indicated by the curve in FIG. 5 is at least equal, if not superior, to that obtained with any of the other prior art techniques mentioned hereinabove.

That the frequency versus resistance sensitivity of the tunnel diode oscillator, which gives rise to the $$\frac{\Delta T}{\Delta \omega}$$

sensitivity in accordance with the present invention, is superior to that of a transistor oscillator may be shown as follows. In a variable frequency transistor oscillator utilizing a tuned tank circuit, the angular frequency of oscillation ω and the Q may be respectively defined as:

$$\omega_{TR} = \sqrt{\frac{1-CR^2}{LC}}$$

and $$Q_{TR} = \frac{\omega(1-\omega^2 LC) - CR}{R}$$

The frequency sensitivity then becomes:

$$\frac{d\omega_{TR}}{dR} = \frac{-\frac{R}{L}}{\sqrt{\frac{1-CR^2}{LC}}} \quad (5)$$

The variable frequency tunnel diode oscillator as embodied herein with $$\left(\frac{R_L}{C} - \frac{G}{C}\right) \approx 0$$

can be shown to have a sensitivity of $$\frac{d\omega_{TD}}{dR_L} = \frac{\frac{G}{2LC}}{\sqrt{\frac{1-GR_L}{LC}}} \quad (6)$$

In order to compare Equations 5 and 6 in a more specific and meaningful manner, typical values for the pertinent circuit components of the two oscillators may be chosen such that oscillation exists in the 5 to 20 mc. range. For the transistor oscillator, R must necessarily be small so that the Q of the circuit will not be too low to support oscillation. Accordingly, it will be assumed that $R = 10$ ohms and $C = 10^{-9}$ farads. For presently available tunnel diodes, $GR_L \approx 0.9$, with $G \approx .02$. By inserting these chosen circuit parameters into Equations 5 and 6, the frequency versus resistance sensitivities for the transistor and tunnel diode oscillators then respectively become:

$$\left|\frac{d\omega_{TR}}{dR}\right| \approx 10^{-3}\omega_0 \quad (7)$$

where $$\omega_0 = \frac{1}{\sqrt{LC}}$$

and $$\left|\frac{d\omega_{TD}}{dR_S}\right| \approx .03\, \omega_0 \quad (8)$$

where $$\omega_0 = \frac{1}{\sqrt{LC}}$$

A comparison of Equations 7 and 8 clearly evidences that the frequency versus resistance sensitivity of the tunnel diode oscillator is considerably superior to that of the usual transistor oscillator.

Because of their unique virtues set forth above, the variable frequency transmitters of the present invention are useful not only as diagnostic instruments for relaying physiological data from within live organisms, but also as accurate telemeters for relaying information from inaccessible areas, e.g., from outer space. They are also useful for translating the magnitude of incident microwave or infrared energy into correlated frequency changes. They may also be used in microwave data transmission systems. For example, if the effective series resistance of the circuit is correctly chosen, oscillation is initiated only if a predetermined value of temperature associated with the thermistor is reached. Thus, binary operation may be effected in which a "zero" output represents one temperature range and a "one" output represents a higher temperature range. Of course, continuous operation with two or more temperature and related frequency ranges may be employed.

It is to be understood that the specific embodiments described herein are merely illustrative of the general principles of the instant invention. Numerous other structural arrangements and modifications as well as applications therefor may be devised in the light of this disclosure by those skilled in the art without departing from the spirit and scope of this invention.

What is claimed is:

1. An oscillator for converting temperature changes into frequency changes comprising a tunnel diode, a thermally sensitive resistor and a blocking capacitor serially connected in shunt with said tunnel diode, an inductance connected in a path which shunts said tunnel diode, said inductance being resonant with the junction capacitance of said tunnel diode at the upper frequency limit of operation, and direct-current means for biasing said tunnel diode to its negative resistance region.

2. An oscillator as defined in claim 1 including a second inductance magnetically coupled to the first-mentioned inductance, and an antenna connected to said second inductance.

References Cited in the file of this patent
UNITED STATES PATENTS

| | | |
|---|---|---|
| 2,588,882 | Rolfson | Mar. 11, 1952 |
| 3,040,188 | Gaertner | June 19, 1962 |

OTHER REFERENCES

Electronics II, Aug. 7, 1959, p. 61 relied upon.
Electronics I, Feb. 1960, pp. 101, 106 relied upon.
Bell System Technical Journal, May 1960, pp. 482, 483 relied upon.